(12) United States Patent
Katrak

(10) Patent No.: US 10,528,409 B2
(45) Date of Patent: Jan. 7, 2020

(54) WATCHDOG MONITORING SYSTEM THAT UTILIZES A DISABLE APPLICATION TO MONITOR OPERATION OF AN ENABLE APPLICATION

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 77 days.

(21) Appl. No.: 15/974,010

(22) Filed: May 8, 2018

(65) Prior Publication Data

US 2019/0034261 A1 Jan. 31, 2019

Related U.S. Application Data

(60) Provisional application No. 62/539,157, filed on Jul. 31, 2017.

(51) Int. Cl.
| | | |
|---|---|---|
| *G06F 11/00* | (2006.01) | |
| *G06F 11/07* | (2006.01) | |
| *H02M 3/157* | (2006.01) | |
| *H02M 1/08* | (2006.01) | |
| *H02J 7/00* | (2006.01) | |
| *H02J 1/00* | (2006.01) | |
| *H02J 1/06* | (2006.01) | |

(52) U.S. Cl.
CPC ...... *G06F 11/0757* (2013.01); *G06F 11/0721* (2013.01); *H02M 3/157* (2013.01); *H02J 1/06* (2013.01); *H02J 7/0013* (2013.01); *H02J 7/0054* (2013.01); *H02J 2001/008* (2013.01); *H02M 1/08* (2013.01)

(58) Field of Classification Search
CPC ........... G06F 11/0757; G06F 11/0721; H02J 7/0013; H02J 2001/008; H02J 7/0054; H02J 1/06; H02M 1/08; H02M 3/157

See application file for complete search history.

(56) References Cited

U.S. PATENT DOCUMENTS

| | | | |
|---|---|---|---|
| 5,233,613 A * | 8/1993 | Allen | G06F 11/0757 714/23 |
| 5,649,098 A * | 7/1997 | Shieh | G06F 11/0757 714/55 |
| 7,496,788 B1 | 2/2009 | Alfieri et al. | |
| 2003/0204792 A1* | 10/2003 | Cahill | G06F 11/0757 714/55 |
| 2011/0074609 A1 | 3/2011 | Lin | |

FOREIGN PATENT DOCUMENTS

| | | |
|---|---|---|
| JP | 2011258032 A | 12/2011 |
| KR | 20060093975 A | 8/2006 |
| KR | 101625864 B1 | 6/2016 |
| KR | 101749540 B1 | 6/2017 |

\* cited by examiner

*Primary Examiner* — Jason B Bryan
(74) *Attorney, Agent, or Firm* — Buckert Patent & Trademark Law Firm PC; John F. Buckert

(57) ABSTRACT

A watchdog monitoring system having a watchdog integrated circuit and a microcontroller is provided. The microcontroller has a microprocessor, and a digital input/output device with an enable pin and a disable pin. A disable application in the microcontroller monitors the enable pin of the digital input-output device, and if the enable pin does not have a high logic state within a predetermined amount of time after a first time indicating that the microcontroller is malfunctioning, then the disable application generates a control message.

6 Claims, 4 Drawing Sheets

WATCHDOG MONITORING SYSTEM THAT UTILIZES A DISABLE APPLICATION TO MONITOR OPERATION OF AN ENABLE APPLICATION

CROSS-REFERENCE TO RELATED APPLICATION

This application claims priority to U.S. Provisional Patent Application No. 62/539,157 filed on Jul. 31, 2017, the entire contents of which are hereby incorporated by reference herein.

BACKGROUND

The inventor herein has recognized a need for an improved watchdog monitoring system that utilizes a microcontroller with a disable application that monitors operation of an enable application. The enable application is provided to start a timer with a watchdog integrated circuit, and the disable application is provided to stop the timer in the watchdog integrated circuit. The disable application detects when the enable application is malfunctioning and generates a control message to take a safe action in response thereto.

SUMMARY

A watchdog monitoring system in accordance with an exemplary embodiment is provided. The watchdog monitoring system includes a watchdog integrated circuit having an enable pin and a disable pin. The watchdog monitoring system further includes a microcontroller having a microprocessor, and a digital input/output device with an enable pin and a disable pin. The enable pin of the digital input-output device is electrically coupled to the enable pin of the watchdog integrated circuit. The disable pin of the digital input-output device is electrically coupled to the disable pin of the watchdog integrated circuit. The microprocessor has an enable application and a disable application. The enable application commands the enable pin of the digital input-output device to transition from a high logic state to a low logic state at a first time that indicates an enable state has been initiated, and in response the watchdog integrated circuit starts an internal timer. The disable application commands the disable pin of the digital input-output device to transition from the high logic state to the low logic state at a second time that indicates a disable state has been initiated, and in response the watchdog integrated circuit stops the internal timer. The disable application monitors the enable pin of the digital input-output device, and if the enable pin of the digital input-output device does not have the high logic state within a predetermined amount of time after the second time indicating that the microcontroller is malfunctioning, then the disable application generates a control message.

A watchdog monitoring system in accordance with another exemplary embodiment is provided. The watchdog monitoring system includes a watchdog integrated circuit having an enable pin and a disable pin. The watchdog monitoring system further includes a microcontroller having a microprocessor, and a digital input/output device with an enable pin and a disable pin. The enable pin of the digital input-output device is electrically coupled to the enable pin of the watchdog integrated circuit. The disable pin of the digital input-output device is electrically coupled to the disable pin of the watchdog integrated circuit. The microprocessor has an enable application and a disable application. The enable application commands the enable pin of the digital input-output device to transition from a high logic state to a low logic state at a first time that indicates an enable state has been initiated, and in response the watchdog integrated circuit starts an internal timer. The disable application commands the disable pin of the digital input-output device to transition from the high logic state to the low logic state at a second time that indicates a disable state has been initiated, and in response the watchdog integrated circuit stops the internal timer within the watchdog integrated circuit. The enable application commands the enable pin of the digital input-output device to transition from the low logic state to the high logic state at a third time. The disable application monitors the enable pin of the digital input-output device, and if the enable pin of the digital input-output device has the high logic state at a fourth time which corresponds to a predetermined amount of time after the third time indicating that the microcontroller is malfunctioning, then the disable application generates a control message.

DETAILED DESCRIPTION

Figure 1:
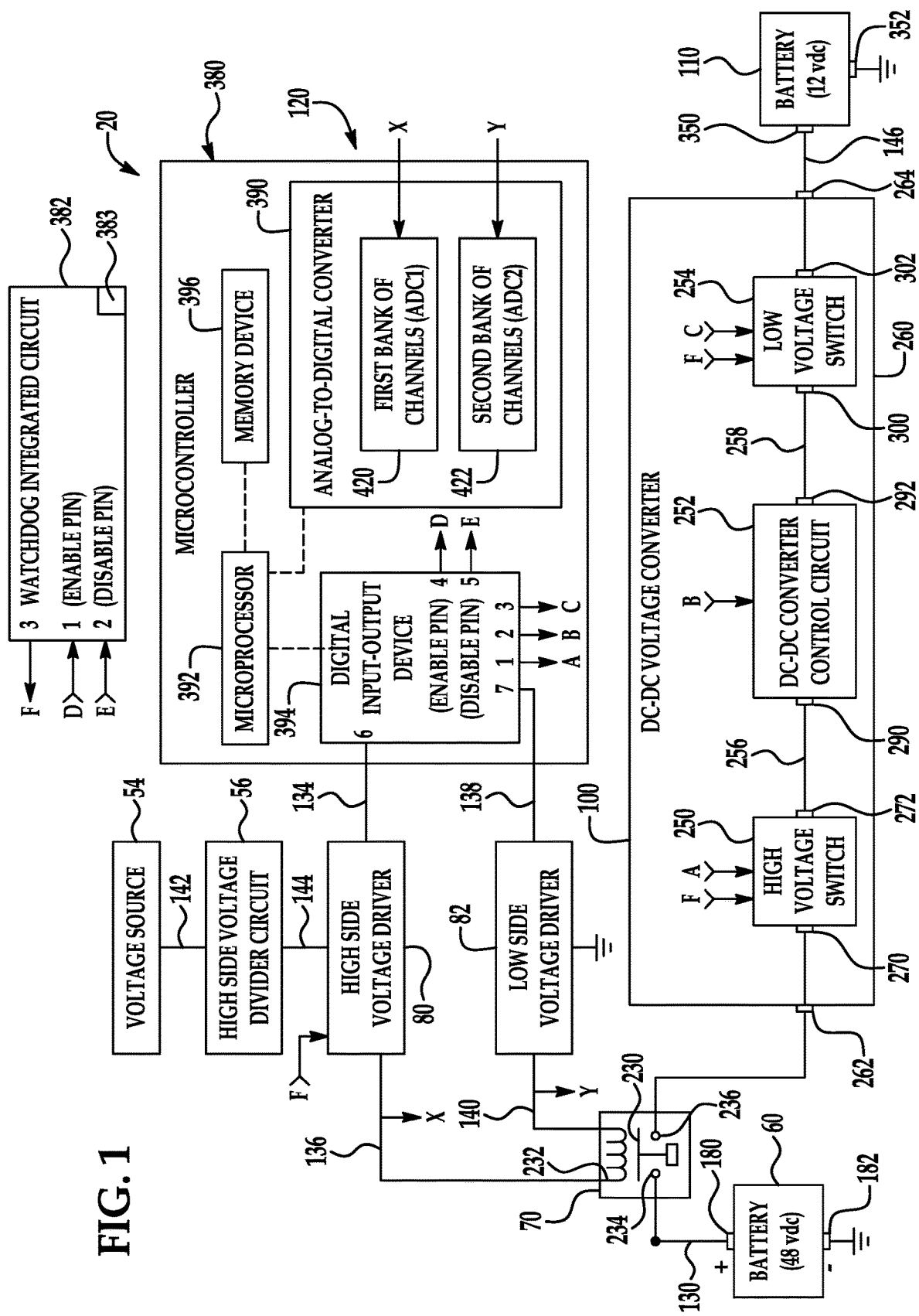
FIG. 1 is a schematic of a vehicle having a watchdog monitoring system with a microcontroller and a watchdog integrated circuit, in accordance with an exemplary embodiment.
Figure 2:
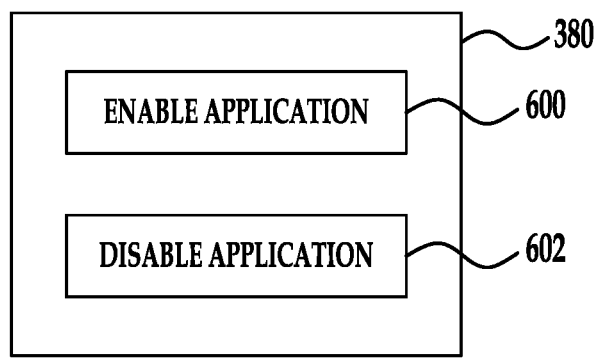
FIG. 2 is a block diagram of the microcontroller of FIG. 1 having an enable application and a disable application therein.

Referring to FIGS. 1 and 2, a vehicle 20 is provided. The vehicle 20 includes a voltage source 54, a high side voltage divider circuit 56, a battery 60, a contactor 70, a high side voltage driver 80, a low side voltage driver 82, a DC-DC voltage converter 100, a battery 110, a watchdog monitoring system 120 in accordance with an exemplary embodiment, and electrical lines 130, 132, 134, 136, 138, 140, 142, 144, 146.

For purposes of understanding, a node is a region or a location in an electrical circuit.

The term "high logic state" corresponds to high logic voltage (e.g., 5 Vdc) or a voltage representing a binary 1 value.

The term "low logic state" corresponds to low logic voltage (e.g., 0 Vdc) or a voltage representing a binary 0 value.

The term "HL state" means high logic state.

The term "LL state" means low logic state.

Referring to FIG. 1, the voltage source 54 is provided to generate a first voltage (e.g., 48 Vdc) that is received by the high side voltage divider circuit 56. The voltage source 54 is electrically coupled to the high side voltage divider circuit 56 utilizing the electrical line 142. The high side voltage divider circuit 56 receives the first voltage from the voltage source 54 and outputs a second voltage that is received by the high side voltage driver 80 utilizing the electrical line 144.

The battery 60 includes a positive terminal 180 and a negative terminal 182. In an exemplary embodiment, the battery 60 generates 48 Vdc between the positive terminal 180 and the negative terminal 182. The positive terminal 180 is electrically coupled to a node 234 of the contactor 70. The negative terminal 182 is electrically coupled to electrical ground.

The contactor 70 has a contact 230, a contactor coil 232, a first node 234, and a second node 236. The first node 234 is electrically coupled to the positive terminal 180 of the battery 60 utilizing the electrical line 130. The second node 236 is electrically coupled to the first node 270 of the high voltage switch 250 of the DC-DC voltage converter 100 utilizing the electrical line 132. When the digital input-output device 394 of the microcontroller 380 generates first and second control signals that are received by the high side voltage driver 80 and the low side voltage driver 82, respectively, the contactor coil 232 is energized which transitions the contact 230 to a closed operational state. Alternately, when the digital input-output device 394 of the microcontroller 380 generates third and fourth control signals that are received by the high side voltage driver 80 and the low side voltage driver 82, respectively, the contactor coil 232 is de-energized which transitions the contact 230 to an open operational state. In an exemplary embodiment, the third and fourth control signals can each be a ground voltage level.

The high side voltage driver 80 and the low side voltage driver 82 are provided to energize or de-energize the contactor coil 232.

The high side voltage driver 80 is electrically coupled to a digital input-output device 394 of the microcontroller 380 utilizing the electrical line 134. The high side voltage driver 80 is further electrically coupled to a first end of the contactor coil 232 utilizing the electrical line 136. The high side voltage driver 80 is further electrically coupled to the high side voltage divider circuit 56 via the electrical line 144. The high side voltage driver 144 utilizes the second voltage from the high side voltage divider circuit 56 and outputs a pulse width modulated signal on electrical line 136 for energizing the contactor coil 232, when the high side voltage driver 144 receives a control signal from the digital input-output device 394. The high side voltage driver 80 is further electrically coupled to the pin 3 of the watchdog integrated circuit 382, and can receive a control signal therefrom which disable operation of the high side voltage driver 80.

The low side voltage driver 82 is electrically coupled to the digital input-output device 394 of the microcontroller 380 utilizing the electrical line 138. The low side voltage driver 82 is further electrically coupled to a second end of the contactor coil 232 utilizing the electrical line 140. The low side voltage driver 82 is configured to conduct an electrical current therethrough to the electrical ground for energizing the contactor coil 232, when the low side voltage driver 82 receives a control signal from the digital input-output device 394.

The DC-DC voltage converter 100 includes a high voltage switch 250, a DC-DC converter control circuit 252, and a low voltage switch 254, electrical lines 256, 258, and a housing 260. The housing 260 holds the high voltage switch 250, the DC-DC converter control circuit 252, and the low voltage switch 254 therein. In a first operational mode, the DC-DC voltage converter 100 outputs a voltage from a second node 302 for charging the battery 110. In a second operational mode, the DC-DC voltage converter 100 outputs a voltage at a first node 270 for charging the battery 60.

The high voltage switch 250 includes a first node 270 and a second node 272. In an exemplary embodiment, the high voltage switch 250 is a bi-directional MOSFET switch. Of course, in an alternative embodiment, the high voltage switch 250 could be replaced with another type of switch having desired voltage and current capabilities. The first node 270 is electrically coupled to the second node 236 of the contactor 70. The second node 272 is electrically coupled to a first node 290 of the DC-DC converter control circuit 252. When the microcontroller 380 generates a first control signal (e.g., control signal "A" having a high logic level) that is received by the high voltage switch 250 (or that is received by a controller or a microprocessor within the DC-DC voltage converter 100 that is operably coupled to the switch 250), the microcontroller 380 induces the switch 250 to transition to a closed operational state. When the microcontroller 380 generates a second control signal (e.g., control signal "A" having a low logic level), the microcontroller 380 induces the switch 250 to transition to an open operational state. In an exemplary embodiment, the second control signal is a ground level control signal.

The DC-DC converter control circuit 252 has a first node 290 and a second node 292. The DC-DC converter control circuit 252 can convert a DC voltage received at the first node 290 to another DC voltage output at the second node 292, based on control signals from the microcontroller 380. Alternately, the DC-DC converter control circuit 252 can convert a DC voltage received at the second node 292 to another DC voltage that is output at the first node 290, based on control signals from the microcontroller 380.

The low voltage switch 254 includes a first node 300 and a second node 302. The first node 300 is electrically coupled to the second node 292 of the DC-DC converter control circuit 252 utilizing the electrical line 258. The second node 302 is electrically coupled to the battery 110 utilizing the electrical line 146. In an exemplary embodiment, the low voltage switch 254 is a bi-directional MOSFET switch, and has an identical structure as the high voltage switch 250. Of course, in an alternative embodiment, the low voltage switch 254 could be replaced with another type switch having desired voltage and current capabilities. When the microcontroller 380 generates a first control signal (e.g., control signal "C" having a high logic level) that is received by the low voltage switch 254 (or that is received by a controller or a microprocessor within the DC-DC voltage converter 100 that is operably coupled to the switch 254), the microcontroller 380 induces the switch 254 to transition to a closed operational state. When the microcontroller 380 generates a second control signal (e.g., control signal "C" having a low logic level), the microcontroller 380 induces the switch 254 to transition to an open operational state. In an exemplary embodiment, the second control signal is a ground level control signal.

The battery 110 includes a positive terminal 350 and a negative terminal 352. In an exemplary embodiment, the battery 110 generates 12 Vdc between the positive terminal 350 and the negative terminal 352. The positive terminal 350 is electrically coupled to the second node 302 of the low voltage switch 254 of the DC-DC voltage converter 100. The negative terminal 352 is electrically coupled to an electrical ground, which may be electrically isolated from the electrical ground associated with the battery 60.

Referring to FIGS. 1 and 2, the watchdog monitoring system 120 is provided to monitor operation of the microcontroller 380. The watchdog monitoring system 120 includes a microcontroller 380 and a watchdog integrated circuit 382. An advantage of the watchdog monitoring system 120, is that the system 120 utilizes a disable application 602 which monitors an enable application 600 to detect when the enable application 600 is malfunctioning. When the enable application 600 is malfunctioning, the disable application 602 generates a control message that induces the microcontroller 380 to take safe actions in response thereto.

The microcontroller 380 has an analog-to-digital converter 390, a microprocessor 392, a digital input-output device 394, and a memory device 396.

The analog-to-digital converter 390 includes a first bank of channels 420 (also referred to as "ADC1") and a second bank of channels 422 (also referred to as "ADC2"). A channel of the first bank of channels 420 is electrically coupled to the electrical line 136 to monitor an output voltage from the high side voltage driver 80. A channel of the second bank of channels 422 is electrically coupled to the electrical line 140 to monitor an output voltage from the low side voltage driver 82.

The digital input-output device 394 includes pins 1, 2, 3, 4, 5, 6 and 7.

The pin 1 of the digital input-output device 394 is electrically coupled to the high voltage switch 250. When the pin 1 has a high logic state, the high voltage switch 250 is transitioned to a closed operational state. Alternately, when the pin 1 has a low logic state, the high voltage switch 250 is transitioned to an open operational state.

The pin 2 of the digital input-output device 394 is electrically coupled to the DC-DC converter control circuit 252. It should be understood that a plurality of additional pins of the digital input-output device 394 could be electrically coupled to the DC-DC converter control circuit 252 for providing a plurality of control signals to the DC-DC converter control circuit 252 for controlling operation of the DC-DC converter control circuit 252.

The pin 3 of the digital input-output device 394 is electrically coupled to the low voltage switch 254. When the pin 3 has a high logic state, the low voltage switch 254 is transitioned to a closed operational state. Alternately, when the pin 3 has a low logic state, the low voltage switch 254 is transitioned to an open operational state.

The pin 4 (i.e., enable pin 4) of the digital input-output device 394 is electrically coupled to the enable pin 1 of the watchdog integrated circuit 382. When the enable pin 4 is transitioned from a high logic state to a low logic state, an internal timer 383 within the watchdog integrated circuit 382 is started.

The pin 5 (i.e., disable pin 5) of the digital input-output device 394 is electrically coupled to the disable pin 2 of the watchdog integrated circuit 382. When the pin 5 is transitioned from a high logic state to a low logic state, an internal timer 383 within the watchdog integrated circuit 382 is stopped and reset.

The microcontroller 380 is programmed to execute an enable application 600 and a disable application 602 stored in the memory device 396 for implementing the methods described herein. The microprocessor 392 is operably coupled to the analog-to-digital converter 390, the digital input-output device 394, and the memory device 396. The digital input-output device 394 can output digital control signals that are received by the voltage drivers 80, 82 for controlling the operation of the contactor 70. The memory device 396 stores data and software applications for implementing the methods described therein.

The watchdog integrated circuit 382 includes pins 1, 2, 3. The pin 1 (i.e., enable pin 1) of the watchdog integrated circuit 382 is electrically coupled to the pin 4 (i.e., enable pin) of the digital input-output device 394. The pin 2 (i.e., disable pin 2) of the watchdog integrated circuit 382 is electrically coupled to the pin 5 (i.e., disable pin 5) of the digital input-output device 394. The pin 3 (i.e., control pin 3) of the watchdog integrated circuit 382 is electrically coupled to the high side voltage driver 80, the high voltage switch 250, and the low voltage switch 254. When the pin 3 has a low logic state, the high side voltage driver 80 is disabled such that the contactor 70 transitions to an open operational state, the high voltage switch 250 transitions to an open operational state, and the low voltage switch 254 transitions to an open operational state.

Figure 3:
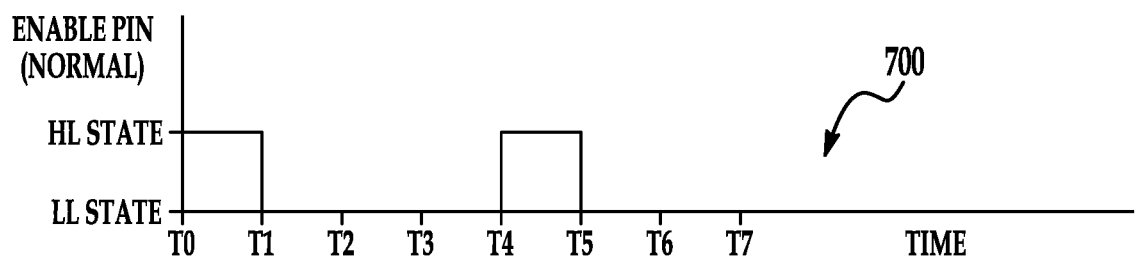
FIG. 3 is a schematic of logic states of a voltage at an enable pin of the microcontroller of FIG. 1 when the microcontroller is operating as desired during a first time period.
Figure 4:
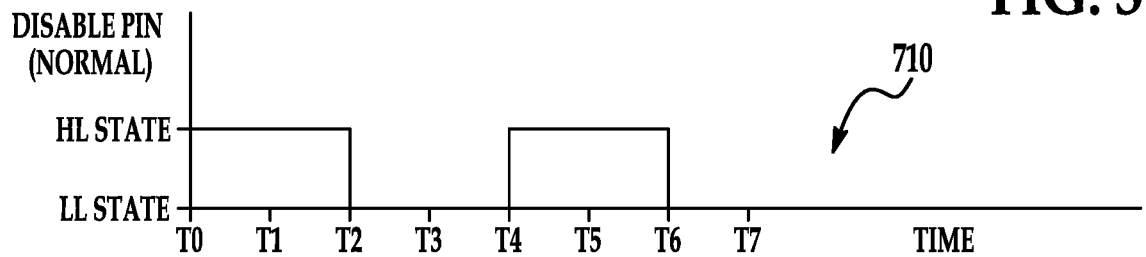
FIG. 4 is a schematic of logic states of a voltage at a disable pin of the microcontroller of FIG. 1 when the microcontroller is operating as desired during the first time period of FIG. 3.

Referring to FIGS. 1, 3 and 4, the logic states of a voltage at an enable pin 4 of the microcontroller 380 and the logic states of a voltage at a disable pin 5 of the microcontroller 380 when the microcontroller 380 is operating as desired during a first time period will be explained. As shown at time T1, the enable pin 4 is transitioned from a high logic state to a low logic state which starts an internal timer 383 within the watchdog integrated circuit 382. At time T2, the disable pin 5 is transitioned from the high logic state to the low logic state to stop and reset the internal timer 383. At time T4, both the enable pin 4 in the disable pin 5 are transitioned from the low logic state to the high logic state. Thereafter, at time T5, the enable pin 4 is transitioned from the high logic state to the low logic state to start the internal timer 383. At time T6, the disable pin 5 is transitioned from the high logic state to the low logic state to stop and reset the internal timer 383.

Figure 5:
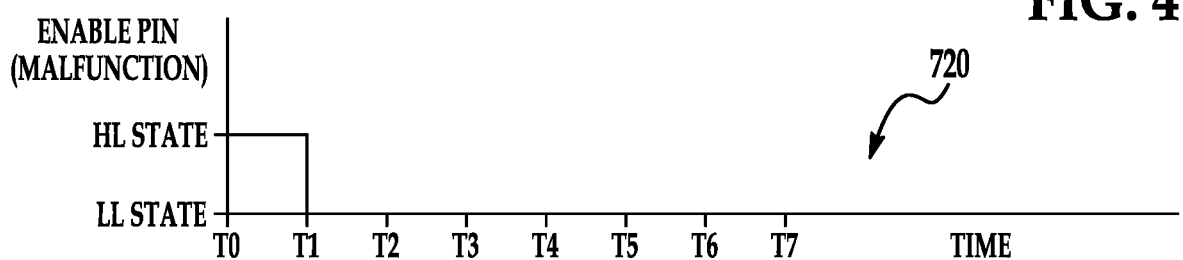
FIG. 5 is a schematic of logic states of a voltage at the enable pin of the microcontroller of FIG. 1 when an enable application is malfunctioning during a second time period.
Figure 6:
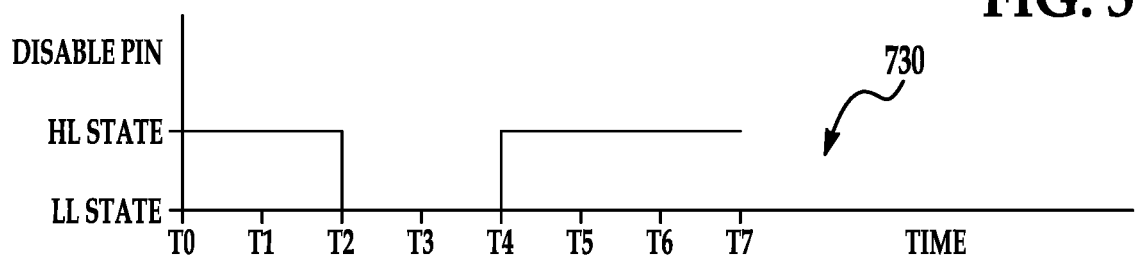
FIG. 6 is a schematic of logic states of a voltage at a disable pin of the microcontroller of FIG. 1 when the enable application is malfunctioning during the second time period of FIG. 5.

Referring to FIGS. 1, 5 and 6, the logic states of a voltage at an enable pin 4 of the microcontroller 380, and the logic states of a voltage at a disable pin 5 of the microcontroller 380 when the enable application 600 (controlling the logic state of the enable pin 4) is malfunctioning (at time T4) will be explained. As shown at time T1, the enable pin 4 is transitioned from a high logic state to a low logic state which starts the internal timer 383 within the watchdog integrated circuit 382. At time T2, the disable pin 5 is transitioned from the high logic state to the low logic state to stop the internal timer 383 within the watchdog integrated circuit 382. At time T4, the enable pin 4 is not transitioned from the low logic state to the high logic state indicating that the enable application 600 (shown in FIG. 2) is malfunctioning.

Figure 7:
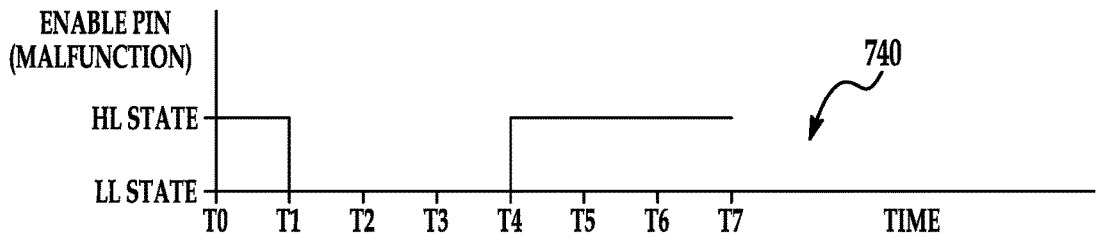
FIG. 7 is a schematic of logic states of a voltage at the enable pin of the microcontroller of FIG. 1 when an enable application is malfunctioning during a third time period.
Figure 8:
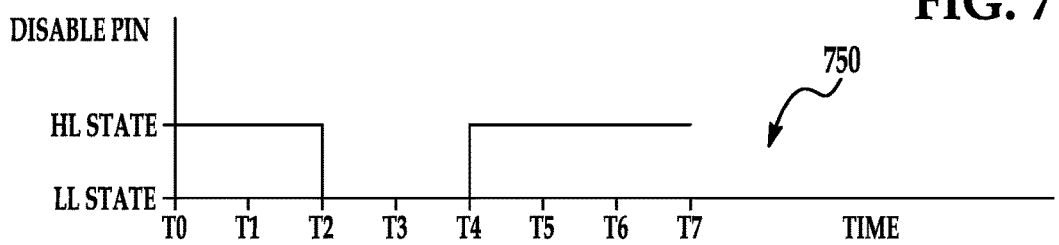
FIG. 8 is a schematic of logic states of a voltage at a disable pin of the microcontroller of FIG. 1 when the enable application is malfunctioning during the third time period of FIG. 7.
Figure 9:
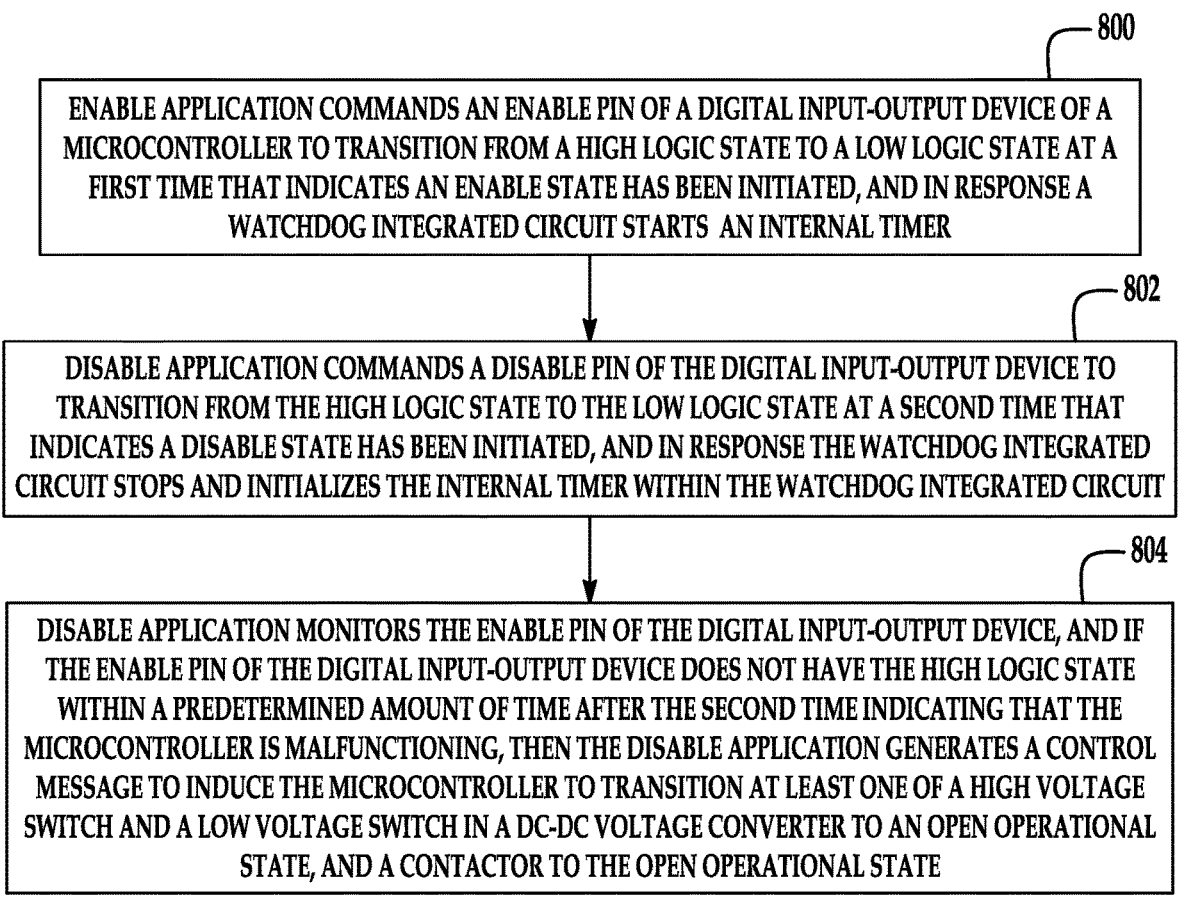
FIG. 9 is a flowchart of a method for detecting when an enable application in the microcontroller of FIG. 1 is malfunctioning in accordance with another exemplary embodiment.
Figure 10:
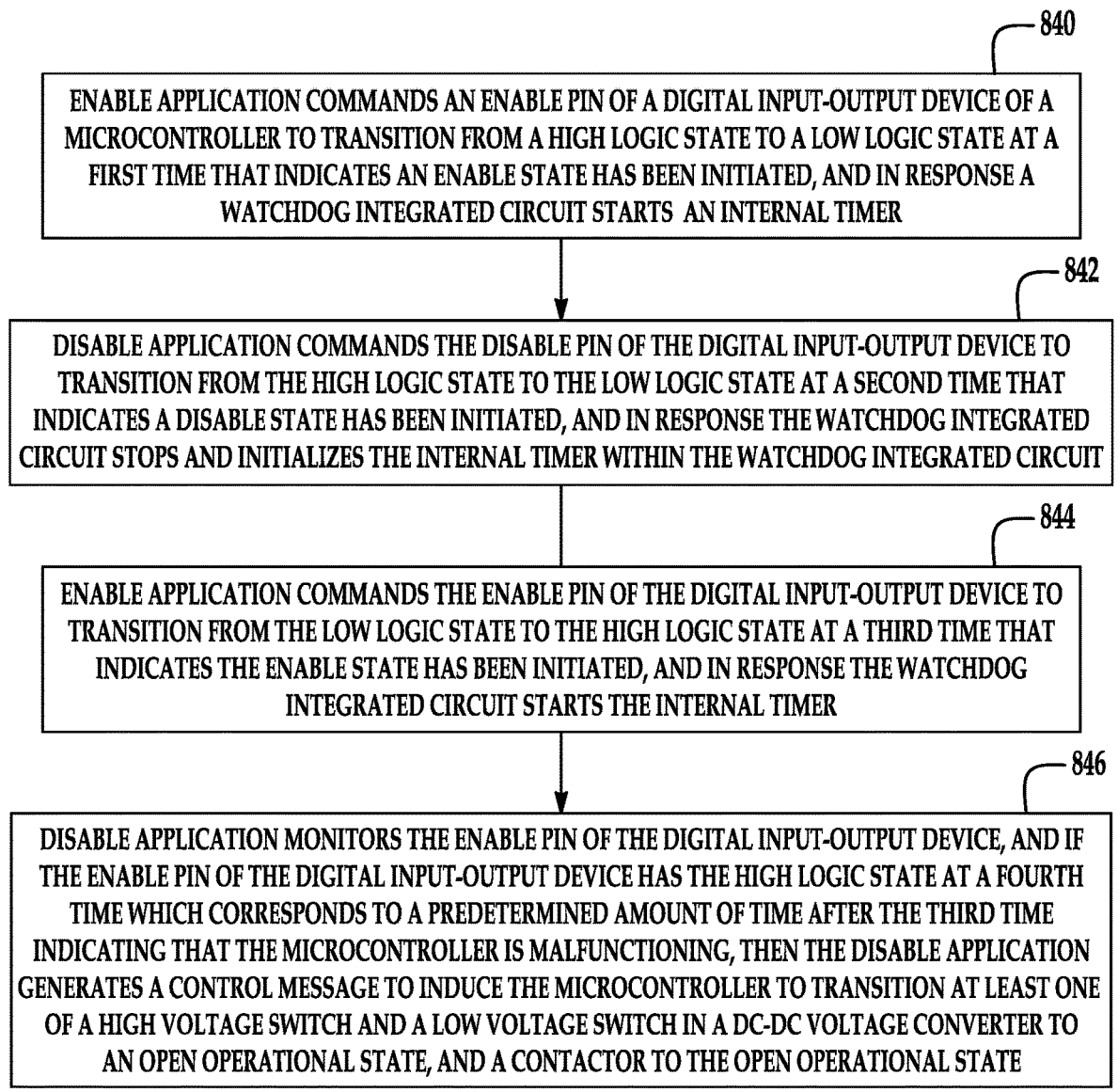
FIG. 10 is a flowchart of a method for detecting when an enable application in the microcontroller of FIG. 1 is malfunctioning in accordance with another exemplary embodiment.

Referring to FIGS. 1, 7 and 8, the logic states of a voltage at an enable pin 4 of the microcontroller 380, and the logic states of a voltage at a disable pin 5 of the microcontroller 380 when the enable application 600 (controlling the logic state of the enable pin 4) is malfunctioning (at time T6) will be explained. As shown at time T1, the enable pin 4 is transitioned from a high logic state to a low logic state which starts the internal timer 383 within the watchdog integrated circuit 382. At time T2, the disable pin 5 is transitioned from the high logic state to the low logic state to stop the internal timer 383 within the watchdog integrated circuit 382. At time T4, both the enable pin 4 in the disable pin 5 are transitioned from the low logic state to the high logic state. Thereafter, at time T6, the enable pin 4 is not transitioned from the high logic state to the low logic state indicating that the enable application 600 (shown in FIG. 2) is malfunctioning.

Referring to FIGS. 1, 2, 5, 6 and 9, a diagnostic method for detecting when the enable application 600 is malfunctioning utilizing the disable application 602, will now be explained.

At step 800, the enable application 600 commands the enable pin 4 of the digital input-output device 394 of the microcontroller 380 to transition from a high logic state to a low logic state at a first time (see time T1 in FIG. 5) that indicates an enable state has been initiated, and in response the watchdog integrated circuit 382 starts the internal timer 383. After step 800, the method advances to step 802.

At step 802, the disable application 602 commands a disable pin 5 of the digital input-output device 394 394 to transition from the high logic state to the low logic state at a second time (see time T2 in FIG. 6) that indicates a disable state has been initiated, and in response the watchdog integrated circuit 382 stops and initializes (e.g., 0 count) the internal timer 383 within the watchdog integrated circuit 382. After step 802, the method advances to step 804.

At step 804, the disable application 602 monitors the enable pin 4 of the digital input-output device 394, and if the enable pin 4 of the digital input-output device 394 does not have the high logic state within a predetermined amount of time after the second time (see time T4 in FIG. 5) indicating that the microcontroller 380 is malfunctioning, then the disable application 602 generates a control message to induce the microcontroller 380 to transition at least one of the high voltage switch 250 and the low voltage switch 254 in the DC-DC voltage converter 100 to an open operational state, and the contactor 70 to the open operational state. After step 804, the method is exited.

Referring to FIGS. 1, 2, 7, 8 and 10, a diagnostic method for detecting when the enable application 600 is malfunctioning utilizing the disable application 602, will now be explained.

At step 840, the enable application 600 commands an enable pin 4 of the digital input-output device 394 of the microcontroller 380 to transition from a high logic state to a low logic state at a first time (see time T1 in FIG. 7) that indicates an enable state has been initiated, and in response the watchdog integrated circuit 382 starts the internal timer 383. After step 840, the method advances to step 842.

At step 842, the disable application 602 commands the disable pin 5 of the digital input-output device 394 to transition from the high logic state to the low logic state at a second time (see time T2 in FIG. 8) that indicates a disable state has been initiated, and in response the watchdog integrated circuit 382 stops and initializes (e.g., 0 count) the internal timer 383 within the watchdog integrated circuit 382. After step 842, the method advances to step 844.

At step 844, the enable application 600 commands the enable pin 4 of the digital input-output device 394 to transition from the low logic state to the high logic state at a third time (see time T4 in FIG. 7). After step 844, the method advances to step 846.

At step 846, the disable application 602 monitors the enable pin 4 of the digital input-output device 394, and if the enable pin 4 of the digital input-output device 394 has the high logic state at a fourth time (see time T7 in FIG. 7) which corresponds to a predetermined amount of time after the third time indicating that the microcontroller 380 is malfunctioning, then the disable application 602 generates a control message to induce the microcontroller 380 to transition at least one of the high voltage switch 250 and the low voltage switch 254 in a DC-DC voltage converter 100 to an open operational state, and the contactor 70 to the open operational state. After step 846, the method is exited.

The watchdog monitoring system described herein provides a substantial advantage over other systems. In particular, the watchdog monitoring system utilizes a disable application which monitors an enable application to detect when the enable application is malfunctioning. When the enable application is malfunctioning, the disable application generates a control message that induces a microcontroller to take safe actions in response thereto.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. For example, the term "if" used herein can be replaced with the term "when" throughout the claims and the specification. Additionally, while various embodiments of the claimed invention have been described, it is to be understood that aspects of the invention may include only some of the described embodiments.

What is claimed is:

1. A watchdog monitoring system, comprising:
   a watchdog integrated circuit having an enable pin and a disable pin;
   a microcontroller having a microprocessor, and a digital input/output device with an enable pin and a disable pin, the enable pin of the digital input-output device being electrically coupled to the enable pin of the watchdog integrated circuit, the disable pin of the digital input-output device being electrically coupled to the disable pin of the watchdog integrated circuit; the microprocessor having an enable application and a disable application;
   the enable application commanding the enable pin of the digital input-output device to transition from a high logic state to a low logic state at a first time that indicates an enable state has been initiated, and in response the watchdog integrated circuit starts an internal timer;
   the disable application commanding the disable pin of the digital input-output device to transition from the high logic state to the low logic state at a second time that indicates a disable state has been initiated, and in response the watchdog integrated circuit stops the internal timer; and
   the disable application monitoring the enable pin of the digital input-output device, and if the enable pin of the digital input-output device does not have the high logic state within a predetermined amount of time after the second time indicating that the microcontroller is malfunctioning, then the disable application generates a control message.

2. The watchdog monitoring system of claim 1, wherein the control message induces the microcontroller to transition at least one of a high voltage switch and a low voltage switch in a DC-DC voltage converter to an open operational state.

3. The watchdog monitoring system of claim 1, wherein the control message induces the microcontroller to transition a contactor to the open operational state.

4. A watchdog monitoring system, comprising:

a watchdog integrated circuit having an enable pin and a disable pin;

a microcontroller having a microprocessor, and a digital input/output device with an enable pin and a disable pin; the enable pin of the digital input-output device being electrically coupled to the enable pin of the watchdog integrated circuit, the disable pin of the digital input-output device being electrically coupled to the disable pin of the watchdog integrated circuit; the microprocessor having an enable application and a disable application;

the enable application commanding the enable pin of the digital input-output device to transition from a high logic state to a low logic state at a first time that indicates an enable state has been initiated, and in response the watchdog integrated circuit starts an internal timer;

the disable application commanding the disable pin of the digital input-output device to transition from the high logic state to the low logic state at a second time that indicates a disable state has been initiated, and in response the watchdog integrated circuit stops the internal timer within the watchdog integrated circuit;

the enable application commanding the enable pin of the digital input-output device to transition from the low logic state to the high logic state at a third time; and the disable application monitoring the enable pin of the digital input-output device, and if the enable pin of the digital input-output device has the high logic state at a fourth time which corresponds to a predetermined amount of time after the third time indicating that the microcontroller is malfunctioning, then the disable application generates a control message.

5. The watchdog monitoring system of claim 4, wherein the control message induces the microcontroller to transition at least one of a high voltage switch and a low voltage switch in a DC-DC voltage converter to an open operational state.

6. The watchdog monitoring system of claim 4, wherein the control message induces the microcontroller to transition a contactor to the open operational state.

* * * * *